United States Patent
Lee et al.

(10) Patent No.: US 12,314,831 B2
(45) Date of Patent: May 27, 2025

(54) ELECTRONIC DEVICE FOR REARRANGING KERNELS OF NEURAL NETWORK AND OPERATING METHOD THEREOF

(71) Applicant: Samsung Electronics Co., Ltd., Gyeonggi-do (KR)

(72) Inventors: Dongyul Lee, Gyeonggi-do (KR); Sunghyun Kim, Gyeonggi-do (KR); Minjung Kim, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 972 days.

(21) Appl. No.: 17/282,057

(22) PCT Filed: Oct. 28, 2020

(86) PCT No.: PCT/KR2020/014773
§ 371 (c)(1),
(2) Date: Apr. 1, 2021

(87) PCT Pub. No.: WO2021/085996
PCT Pub. Date: May 6, 2021

(65) Prior Publication Data
US 2022/0004841 A1    Jan. 6, 2022

(30) Foreign Application Priority Data
Oct. 31, 2019   (KR) ........................ 10-2019-0137812

(51) Int. Cl.
*G06N 3/04*       (2023.01)
*G06F 9/54*       (2006.01)
*H04L 67/10*      (2022.01)

(52) U.S. Cl.
CPC ................. *G06N 3/04* (2013.01); *G06F 9/54* (2013.01); *H04L 67/10* (2013.01)

(58) Field of Classification Search
CPC .............. G06N 3/04; G06F 9/54; H04L 67/10
See application file for complete search history.

(56) References Cited

U.S. PATENT DOCUMENTS 9,747,548 B2   8/2017  Ross et al.
9,805,000 B1   10/2017 Jeyachandra et al.
(Continued)

FOREIGN PATENT DOCUMENTS

KR    10-2017-0128080 A    11/2017
KR    10-2019-0062481 A    6/2019
(Continued)

OTHER PUBLICATIONS

NPL: Cheng Fu, (2018). Towards Fast and Energy-Efficient Binarized Neural Network Inference on FPGA. (Year: 2018).*
(Continued)

*Primary Examiner* — Li B. Zhen
*Assistant Examiner* — Sadik A Alshahari
(74) *Attorney, Agent, or Firm* — Cha & Reiter LLC

(57) ABSTRACT

Disclosed is an electronic device may include a memory storing a neural network including a plurality of layers, each of the plurality of layers comprising a plurality of kernels, and at least one processor, wherein the at least one processor is configured to: arrange the neural network; and perform neural network processing on input data based on the arranged neural network, and wherein the arranging the neural network includes: with respect to each of the plurality of layers of the neural network, identifying a number of first weights of each of a plurality of kernels included in a layer; identifying a turn that each of the plurality of kernels included in the layer has in an operation sequence based on the identified number of first weights; and updating the turn
(Continued)

that each of the plurality of kernels has in the operation sequence based on the identified turn for each of the plurality of kernels.

15 Claims, 11 Drawing Sheets

(56) References Cited

U.S. PATENT DOCUMENTS

| | | | | |
|---|---|---|---|---|
| 11,615,322 | B1* | 3/2023 | Thomas | G06N 3/04 717/145 |
| 11,625,585 | B1* | 4/2023 | Thomas | G06N 3/08 706/15 |
| 2017/0103318 | A1* | 4/2017 | Ross | G06N 3/045 |
| 2017/0147301 | A1* | 5/2017 | Rong | G06F 17/16 |
| 2018/0082181 | A1* | 3/2018 | Brothers | G06N 3/045 |
| 2018/0096226 | A1* | 4/2018 | Aliabadi | G06N 3/045 |
| 2018/0165577 | A1* | 6/2018 | Young | G06N 3/08 |
| 2019/0012580 | A1* | 1/2019 | Ishii | G06N 3/084 |
| 2019/0244106 | A1* | 8/2019 | Franca-Neto | G06N 3/08 |
| 2019/0347555 | A1* | 11/2019 | Park | G06N 3/082 |
| 2020/0401895 | A1* | 12/2020 | Litvak | G06N 3/02 |
| 2021/0201120 | A1* | 7/2021 | Shibata | G06N 3/08 |
| 2021/0264232 | A1* | 8/2021 | Kim | G06N 3/045 |

FOREIGN PATENT DOCUMENTS

| | | |
|---|---|---|
| WO | 2017-201627 A1 | 11/2017 |
| WO | 2017-214728 A1 | 12/2017 |
| WO | 2020-101350 A1 | 5/2020 |

OTHER PUBLICATIONS

NPL: Vijay Daultani, (2016). Convolutional Neural Network Layer Reordering for Acceleration. (Year: 2016).*
NPL: Junyang Zhang, (2018). Design and Implementation of Deep Neural Network for Edge Computing. (Year: 2018).*
NPL: Zhiqiang Liu, (2017). Throughput-Optimized FPGA Accelerator for Deep Convolutional Neural Networks. (Year: 2017).*
Cambricon-X: An Accelerator for Sparse Neural Networks.
An 11.5TOPS/W 1024-MAC Butterfly Structure Dual-Core Sparsity-Aware Neural Processing Unit in 8nm Flagship Mobile SoC.
Towards Fast and Energy-Efficient Binarized Neural Network Inference on FPGA.

* cited by examiner

ELECTRONIC DEVICE FOR REARRANGING KERNELS OF NEURAL NETWORK AND OPERATING METHOD THEREOF

CROSS REFERENCE TO RELATED APPLICATIONS

This application is a National Phase Entry of PCT International Application No. PCT/KR2020/014773, which was filed on Oct. 28, 2020, and claims a priority to Korean Patent Application No. 10-2019-0137812, which was filed on Oct. 31, 2019, the contents of which are incorporated herein by reference.

TECHNICAL FIELD

The disclosure relates to an electronic device, which arranges kernels of a neural network, and an operation method thereof.

BACKGROUND ART

There is research conducted on a neural network, which is modeled on the biological characteristics of human neural cells using mathematical expression. A neural network uses an algorithm that emulates a learning ability which human has, in order to solve a problem of classifying input data as a predetermined group. The neural network may produce mapping between input data and output data via the algorithm. The neural network may be a convolutional neural network (CNN), a recurrent neural network (RNN), deep belief network, restricted Boltzman machine, and the like, but is not limited thereto.

DISCLOSURE OF INVENTION

Technical Problem

An electronic device may obtain output data associated with input data using a neural network. However, in order to obtain the output data associated with the input data via the neural network, the electronic device may need to perform a large amount of operations. Accordingly, there is a desire for a scheme of reducing the amount of operations in association with performing the processing using the neural network.

The technical subject matter of the document is not limited to the above-mentioned technical subject matter, and other technical subject matters which are not mentioned may be understood by those skilled in the art based on the following description.

Solution to Problem

In accordance with an aspect of the disclosure, an electronic device may include a memory storing a neural network including a plurality of layers, each of the plurality of layers comprising a plurality of kernels, and at least one processor, wherein the at least one processor is configured to: arrange the neural network; and perform neural network processing on input data based on the arranged neural network, and wherein, when arranging the neural network, with respect to each of the plurality of layers of the neural network, the at least one processor is configured to: identify the number of first weights of each of a plurality of kernels included in a layer; identify a turn that each of the plurality of kernels included in the layer has in an operation sequence based on the identified number of first weights; and update the turn that each of the plurality of kernels has in the operation sequence based on the identified turn for each of the plurality of kernels, so as to arrange the neural network.

In accordance with an aspect of the disclosure, an operation method of an electronic device may include: arranging a neural network stored in the electronic device using at least one processor of the electronic device, wherein the neural network includes a plurality of layers, each of the plurality of layers comprising a plurality of kernels; and performing, using the at least one processor, neural network processing on input data based on the arranged neural network, and wherein the arranging of the neural network includes: when arranging the neural network, with respect to each of the plurality of layers of the neural network, identifying the number of first weights of each of a plurality of kernels included in a layer; identifying a turn that each of the plurality of kernels included in the layer has in an operation sequence, based on the identified number of first weights; and updating the turn that each of the plurality of kernels has in the operation sequence based on the identified turn for each of the plurality of kernels.

In accordance with an aspect of the disclosure, a non-transitory computer-readable storage medium may include at least one instruction which, when executed, enables at least one processor to: arrange a neural network including a plurality of layers, each of the plurality of layers comprising a plurality of kernels; and perform neural network processing on input data based on the arranged neural network, and wherein, for each of the plurality of layers in the neural network, the instruction for arranging the neural network may identify the number of first weights of each of a plurality of kernels included in a layer; identify a turn that each of the plurality of kernels included in the layer has in an operation sequence based on the identified number of first weights; and update the turn that each of the plurality of kernels has in the operation sequence based on the identified turn for each of the plurality of kernels, so as to arrange the neural network.

Advantageous Effects of Invention

An electronic device and an operation method thereof according to various embodiments may arrange a neural network, and may increase a neural network processing speed.

Effects that could be obtained based on the disclosure are not limited to the above-described effects, and those skilled in the art would be clearly understand other effects which are not mentioned above, based on the descriptions provided below.

BEST MODE FOR CARRYING OUT THE INVENTION

Figure 1:
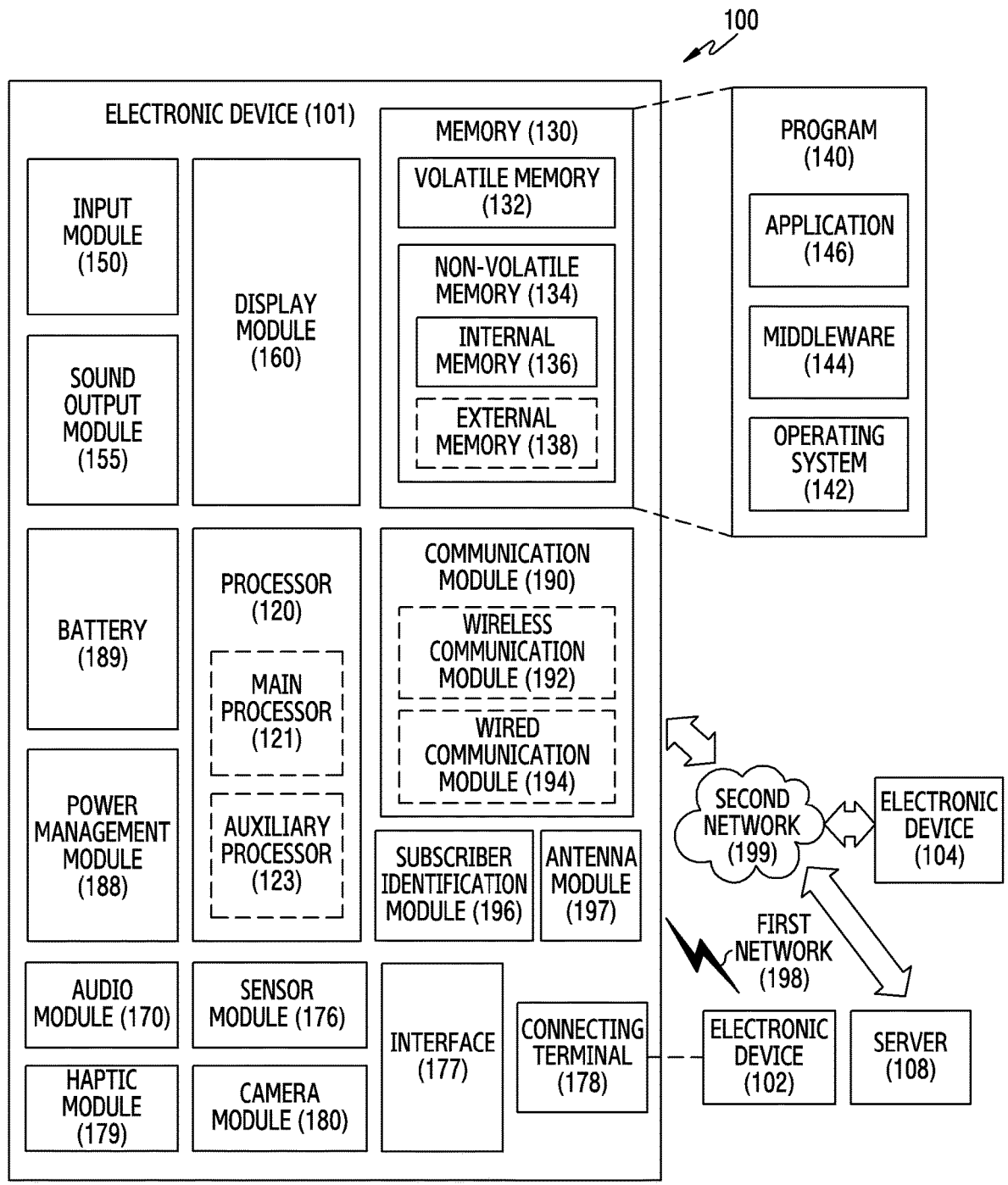
FIG. 1 is a block diagram illustrating an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101.

The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
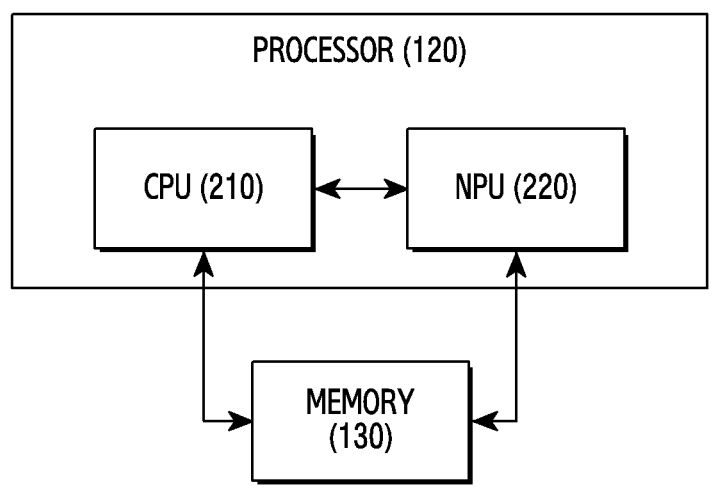
FIG. 2A is a diagram illustrating a processor and a memory of an electronic device according to an embodiment.
Figure 2B:
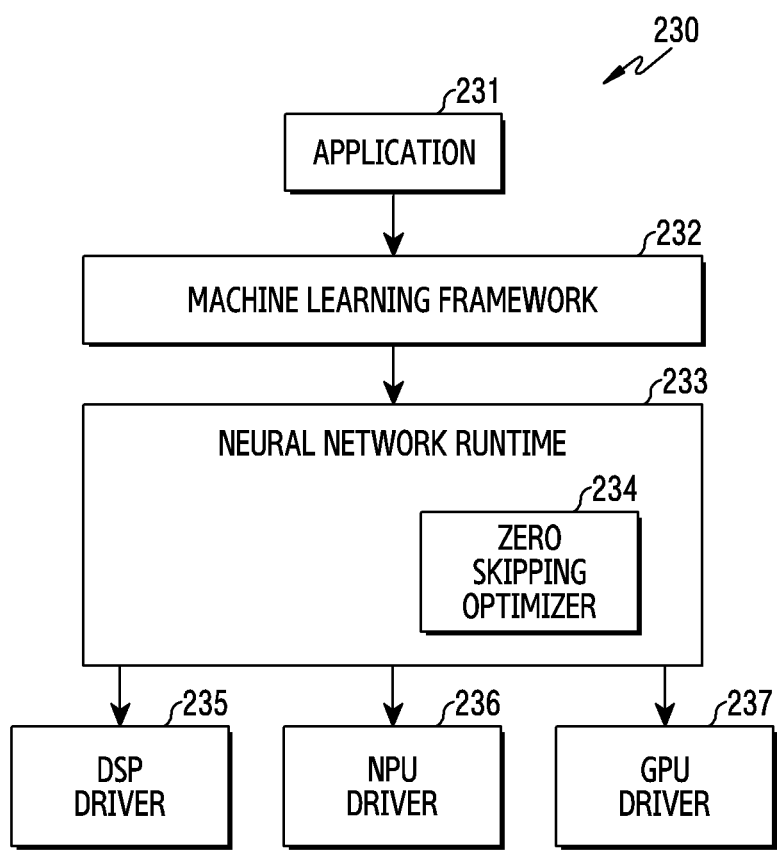
FIG. 2B is a diagram illustrating an example of the architecture of a program of an electronic device according to an embodiment.

FIG. 2A is a diagram illustrating a processor 120 and a memory 130 of an electronic device (e.g., the electronic device 101 of FIG. 1) according to an embodiment. FIG. 2B is a diagram illustrating an example of an architecture 230 of a program (e.g., the program 140 of FIG. 1) of the electronic device 101 according to an embodiment.

Figure 3A:
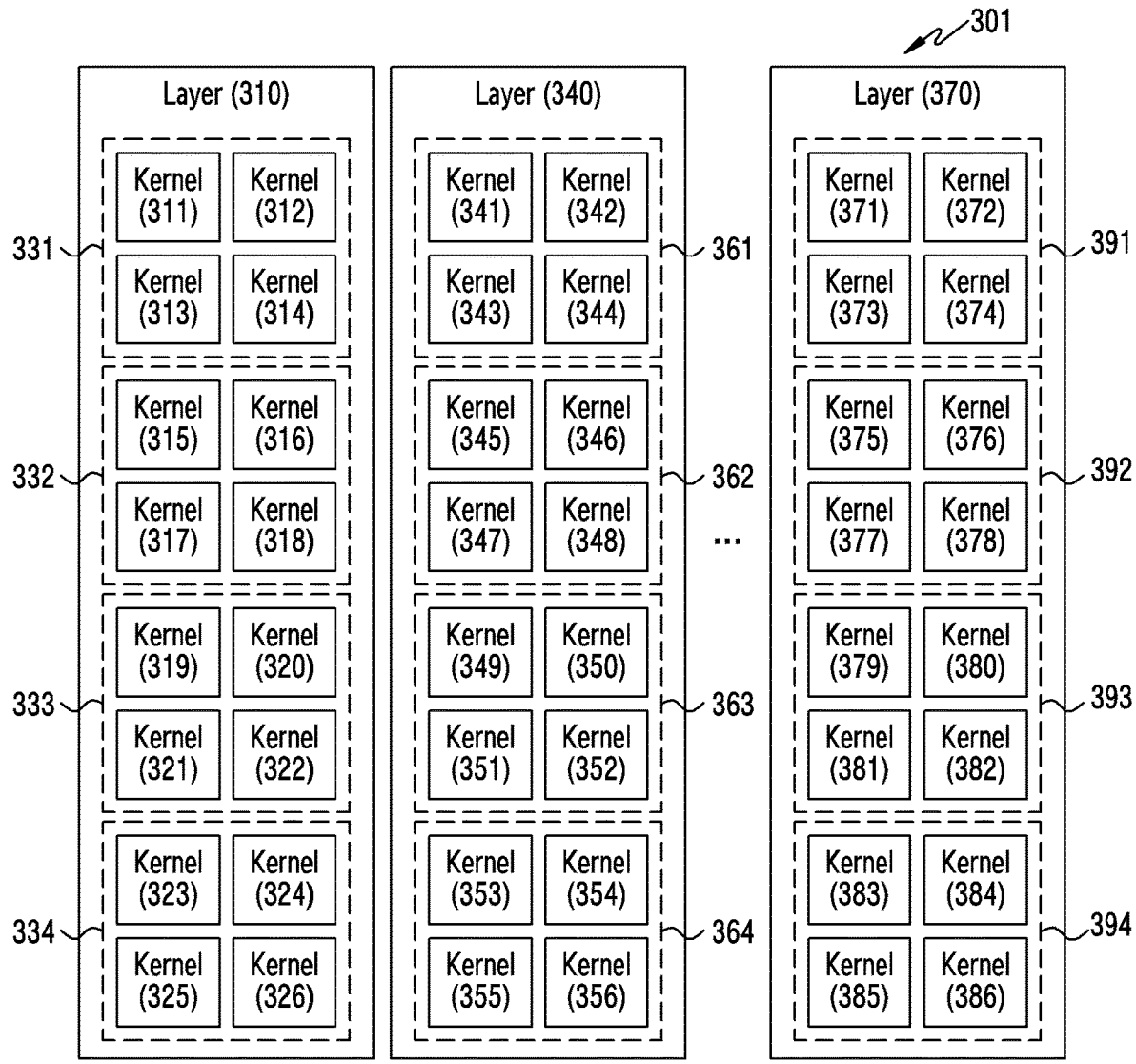
FIG. 3A is a diagram illustrating the structure of a neural network stored in a memory of an electronic device according to an embodiment.
Figure 3B:
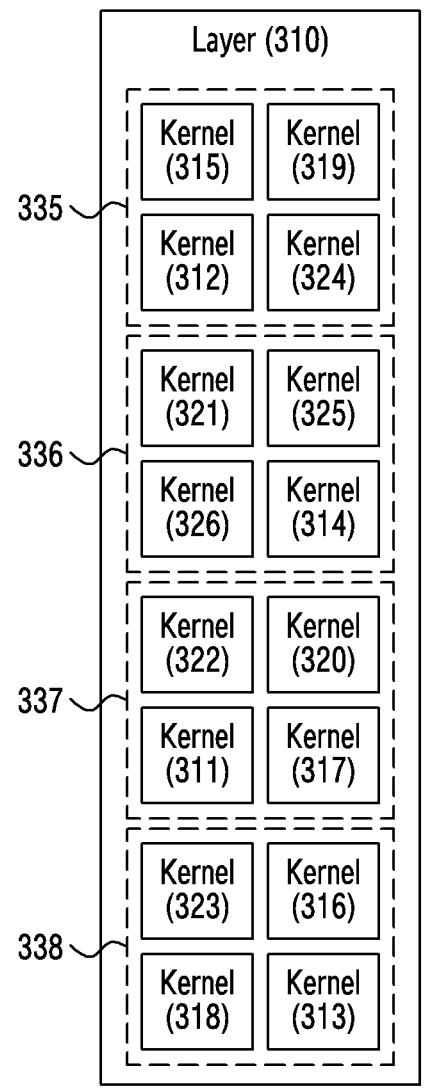
FIG. 3B is a diagram illustrating kernels arranged by an electronic device according to an embodiment.

FIG. 3A is a diagram illustrating the structure of a neural network 301 stored in the memory 130 of the electronic device 101 according to an embodiment. FIG. 3B is a diagram illustrating kernels arranged by the electronic device 101 according to an embodiment.

Figure 4A:
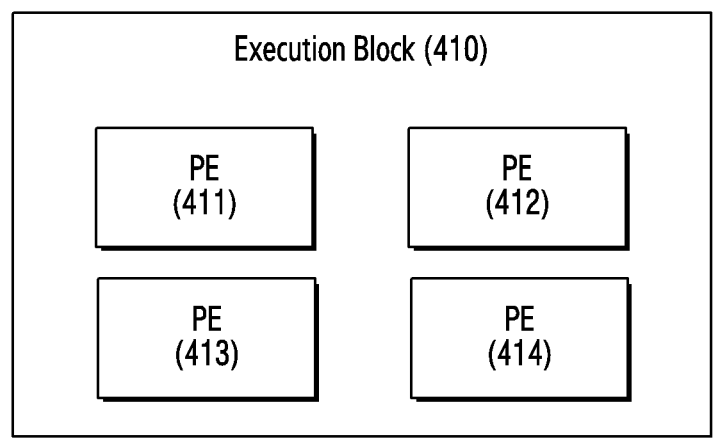
FIG. 4A is a diagram illustrating an execution block of a neural processing unit included in a processor of an electronic device according to an embodiment.
Figure 4B:
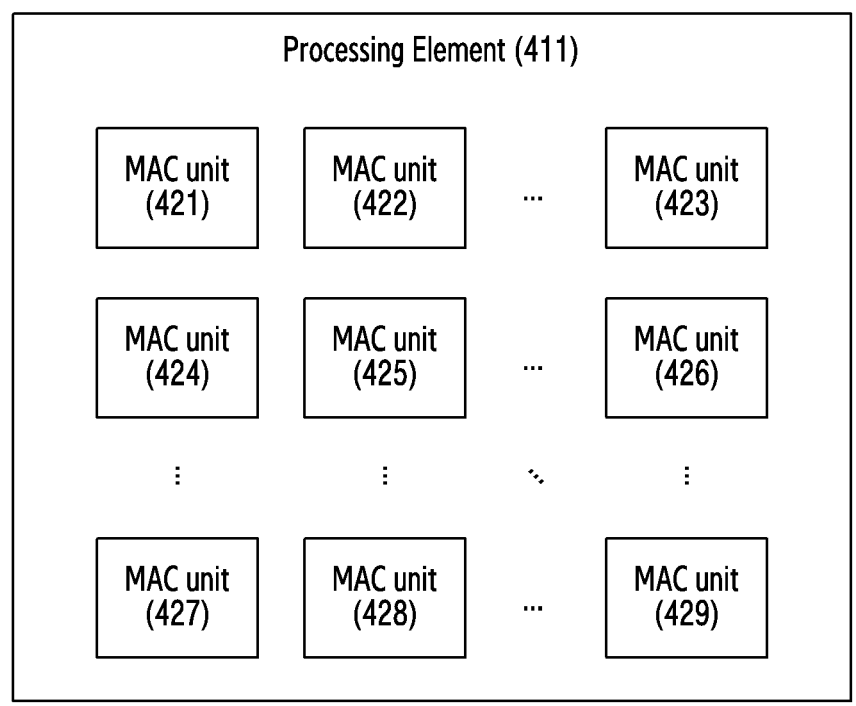
FIG. 4B is a diagram illustrating a processing element included in an execution block of an NPU of an electronic device according to an embodiment.

FIG. 4A is a diagram illustrating an execution block 410 of an NPU 220 included in the processor 120 of the electronic device 101. FIG. 4B is a diagram illustrating a processing element 411 included in the execution block 410 of the NPU 220 of the electronic device 101 according to an embodiment.

According to an embodiment, referring to FIG. 2A, the processor 120 may include a central processing unit (CPU) 210 and a neural processing unit (NPU) 220. According to an embodiment, the CPU 210 may correspond to the main processor 121 of FIG. 1. According to an embodiment, the NPU 220 may correspond to an example of the sub-processor 123 of FIG. 1.

According to an embodiment, the CPU 210 may arrange the neural network 301. According to an embodiment, the CPU 210 may request, from the NPU 220, neural network processing based on the neural network 301. According to an embodiment, the NPU 220 may perform neural network processing based on the neural network 301.

According to an embodiment, the memory 130 may store data for executing elements 231 to 237 included in the architecture 230. According to an embodiment, the elements 231 to 237 included in the architecture 230 may be executed in the CPU 210. According to an embodiment, referring to FIG. 2B, the architecture 230 may include an application 231, a machine learning framework 232, a neural network runtime 233, a zero skipping optimizer 234, and drivers 235, 236, and 237.

According to an embodiment, the application 231 may be referred to as a program for providing a predetermined function (e.g., image capturing, gaming, or searching) to a user. According to an embodiment, the application 231 may be preloaded to the electronic device 101 when the electronic device 101 is produced, or the application may be updated or downloaded from an external electronic device (e.g., the server 108) when the electronic device 101 is used by a user.

According to an embodiment, the machine learning framework 232 may provide various functions to the application 231 so that functions or information provided from one or more resources of the electronic device 101 may be used by the application 231.

According to an embodiment, the neural network runtime 233 may include a library module that a compiler uses in order to add a new function using a programming language while a program (e.g., application 231) is being executed. According to an embodiment, the neural network runtime 233 may include the zero skipping optimizer 234. According to an embodiment, the zero skipping optimizer 234 may provide a function of arranging kernels of a neural network while a program (e.g., the application 231) is being executed.

According to an embodiment, a digital signal processor (DSP) driver 235 may provide an interface that is capable of controlling or managing a DSP. According to an embodiment, the DSP may be an example of the sub-processor 123 of FIG. 1. According to an embodiment, the NPU driver 236 may provide an interface that is capable of controlling or managing the NPU 220. According to an embodiment, the graphic processing unit (GPU) driver 237 may provide an interface that is capable of controlling or managing a GPU. According to an embodiment, the GPU may be an example of the sub-processor 123 of FIG. 1. According to an embodiment, the DSP, NPU 220, the GPU may be used for neural network processing.

According to an embodiment, the CPU 210 may execute the application 231, and, based on a result of the execution of the application 231, may request neural network processing from the NPU 220. According to an embodiment, the CPU 210 may request neural network processing from the NPU 220 based on a user input (e.g., a touch input, a voice input, a hovering input, or a combination thereof) which is input while the application 231 is being executed. According to an embodiment, the NPU 220 may perform neural network processing on input data corresponding to the neural network processing request from the CPU 210. According to an embodiment, the NPU 220 may perform neural network processing on input data using the neural network 301 related to the application 231. According to an embodiment, the input data may be data representing an image, a video, a sound, or a combination thereof. According to an embodiment, the neural network 301 related to the application 231 may be the neural network 301 included in data of the application 231.

According to an embodiment, the CPU 210 may identify whether the neural network 301 is arranged. According to an embodiment, the CPU 210 may identify whether the neural network 301 related to the application 231 is arranged.

According to an embodiment, the CPU 210 may request neural network processing from the NPU 220, and at the same time, may identify whether the neural network 301 is arranged. However, this is merely an example. According to an embodiment, the CPU 210 may download data of the application 231 from an external electronic device (e.g., the server 108), and may identify whether the neural network 301 included in the data of the application 231 is arranged.

According to an embodiment, if changing an operation sequence is not completed for at least one layer of a plurality of layers 310, 340, and 370 in the neural network 301, the CPU 210 may identify that the neural network 301 is not arranged. According to an embodiment, changing the operation sequence may change an operation sequence of kernels 311 to 326, 341 to 356, and 371 to 386 included in each of the plurality of layers 310, 340, and 370. Here, the changing the operation sequence does not mean changing of the sequence of the plurality of layers 310, 340, and 370.

For example, referring to FIG. 3A, the kernels 311 to 326, 341 to 356, and 371 to 386 separated into blocks 331 to 334, 361 to 364, and 391 to 394 of the layers 310, 340, and 370 may be in the state in which the operation sequence of thereof is not changed. In this instance, the CPU 210 may identify that the neural network 301 is unarranged.

According to an embodiment, if the neural network 301 is unarranged, the CPU 210 may change the operation sequence of kernels 311 to 326, 341 to 356, and 371 to 386 included in each of the plurality of layers 310, 340, and 370, using the zero skipping optimizer 234.

According to an embodiment, if the neural network 301 is not arranged, the CPU 210 may change an operation sequence for each layer 310, 340, and 370 of the neural network 301, using the zero skipping optimizer 234.

According to an embodiment, the CPU 210 may change an operation sequence in a circular order sequentially from a layer having a predetermined number of turns among the plurality of layers 310, 340, and 370 of the neural network 301. According to an embodiment, the CPU 210 may change an operation sequence for a layer having a predetermined numberth turn (e.g., the layer 310), and may change an operation sequence for a layer (e.g., the layer 340) having a turn next to the layer having the predetermined numberth turn. For example, the CPU 210 may change an operation sequence for layers in ascending order, from a layer (e.g., the layer 340) having a predetermined numberth turn among the plurality of layers 310, 340, and 370 of the neural network 301. Subsequently, after changing an operation sequence for a layer having a last turn (e.g., the layer 370), the CPU 210 may change an operation sequence for layers in ascending order from a layer having a first turn (e.g., the layer 370) to a layer having a turn before the predetermined numberth turn. According to an embodiment, a layer for which an operation sequence is changed for the first time may be a layer having a first turn (e.g., the layer 370) among the plurality of layers 310, 340, and 370 of the neural network 301. According to an embodiment, a layer for which an operation sequence is changed for the first time may be determined based on a layer processing speed when neural network processing is performed by the NPU 220. For example, if an operation is capable of being performed for three layers when neural network processing is performed in the NPU 220 using the neural network 301 during a reference time, a layer for which an operation sequence is changed for the first time may be a layer having a fourth turn among the plurality of layers 310, 340, and 370 of the neural network 301. According to an embodiment, the reference time may be a period of time spent in changing an operation sequence for a single layer.

According to an embodiment, the CPU 210 may identify, using the zero skipping optimizer 234, the number of elements with a weight having a value of "0" (hereinafter, a "first weight") for each of the kernels (e.g., the kernels 311 to 326) included in a layer (e.g., the layer 310) for which an operation sequence is to be changed. According to an embodiment, the CPU 210 may identify, using the zero skipping optimizer 234, the number of elements with a weight having a value other than "0" (hereinafter, a "second weight") for each of the kernels (e.g., the kernels 311 to 326) included in a layer (e.g., the layer 310) for which an operation sequence is to be changed.

According to an embodiment, the number of second weights of each of the kernels 311 to 326 included in the layer 310 may be as listed in Table 1 below.

TABLE 1

| | Kernel | | | |
| --- | --- | --- | --- | --- |
| | Kernel 311 | Kernel 312 | Kernel 313 | Kernel 314 |
| number of second weights | 224 | 261 | 199 | 231 |
| | Kernel | | | |
| | Kernel 315 | Kernel 316 | Kernel 317 | Kernel 318 |
| number of second weights | 377 | 213 | 223 | 205 |
| | Kernel | | | |
| | Kernel 319 | Kernel 320 | Kernel 321 | Kernel 322 |
| number of second weights | 292 | 225 | 247 | 227 |
| | Kernel | | | |
| | Kernel 323 | Kernel 324 | Kernel 325 | Kernel 326 |
| number of second weights | 216 | 258 | 235 | 234 |

Referring to Table 1, the number of second weights of each of the kernels 311 to 326 may be 224, 261, 199, 231, 377, 213, 223, 205, 292, 225, 247, 227, 216, 258, 235, and 234.

According to an embodiment, the CPU 210 may change a turn that each of the kernels 311 to 326 included in the layer 310 has in an operation sequence based on the number of second weights. According to an embodiment, the CPU 210 may change the turn that each of the kernels 311 to 326 included in the layer 310 has in the operation sequence based on the number of first weights. According to an embodiment, the sum of the number of first weights and the number of second weights may correspond to the number of elements of a kernel. Therefore, the number of first weights may correspond to a value, obtained by subtracting the number of second weights from the number of elements.

For example, referring to FIG. 3B, an operation sequence for the layer 310 may be changed to an operation sequence in which the kernel 315, the kernel 319, the kernel 312, and the kernel 324 have a first turn to a fourth turn in the operation sequence, respectively. For example, referring to FIG. 3B, the operation sequence for the layer 310 may be changed to the operation sequence in which the kernel 321, the kernel 325, the kernel 326, and the kernel 314 have a fifth turn to an eighth turn in the operation sequence, respectively. For example, referring to FIG. 3B, the operation sequence for the layer 310 may be changed to the operation sequence in which the kernel 322, the kernel 320, the kernel 311, and the kernel 317 have a ninth turn to a twelfth turn in the operation sequence, respectively. For example, referring to FIG. 3B, the operation sequence for the layer 310 may be changed to the operation sequence in which the kernel 323, the kernel 316, the kernel 318, and the kernel 313 have a thirteenth turn to a sixteenth turn in the operation sequence, respectively.

According to an embodiment, the CPU 210 may separate the kernels 311 to 326 of the layer 310 with a new operation sequence, into blocks. According to an embodiment, the CPU 210 may separate as many kernels as the number of processing elements (PE) 411 to 414 included in the execution block 410 of the NPU 220, as a single block. For example, if the number of PEs 411 to 414 included in the execution block 410 of the NPU 220 is 4, the CPU 210 may separate every four kernels of the kernels 311 to 326 of the layer 310 having the new operation sequence, as a single block. For example, the CPU 210 may separate the kernels 315, 319, 312, and 324 having a first turn to fourth turn in an operation sequence as a block 335, may separate the kernels 321, 325, 326, and 314 having a fifth turn to eighth turn in the operation sequence as a block 336, may separate the kernels 322, 320, 311, and 317 having a ninth turn to twelfth turn in the operation sequence as a block 337, and may separate the kernels 323, 316, 318, and 313 having a thirteenth turn to sixteenth turn in the operation sequence as a block 338. Accordingly, the blocks 331 to 334 before the change of the operation sequence for the layer 310 may be changed to the blocks 335 to 338. Here, it is merely an example that the number of processing elements 411 to 414 included in the execution block 410 is 4. According to an embodiment, the execution block 410 may include processing elements, the number of which may correspond to a natural number greater than or equal to 1.

According to an embodiment, the CPU 210 may provide information associated with the layer 310 which has a new operation sequence to the NPU 220. According to an embodiment, the CPU 210 may provide, to the NPU 220, information associated with the layer 340 having a turn next to the layer (e.g., the layer 310) that the NPU 220 processes, and information associated with the layer 310 having the new operation sequence.

According to an embodiment, the CPU 210 may provide, to the NPU 220, block information associated with the layer 310, location information of a first weight, location information of a second weight, operation sequence information, or a combination thereof.

According to an embodiment, if the neural network 301 is at least partially arranged, the NPU 220 may perform neural network processing on input data using the at least partially arranged neural network 301. According to an embodiment, the NPU 220 may suspend performing the neural network processing using the existing neural network 301 which is unarranged, and may resume neural network processing on the input data using the arranged neural network 301.

According to an embodiment, while performing neural network processing on the input data using a layer currently having a turn (e.g., the layer 310) in the unarranged neural network 301, if an operation sequence for a layer having a turn (e.g., the layer 340) next to the layer currently having a turn (e.g., the layer 310) is updated, the NPU 220 may perform neural network processing on the input data using the layer having a next turn (e.g., the layer 340) in the at least partially arranged neural network 301.

According to an embodiment, the NPU 220 may process neural network processing on the input data based on information associated with the layer 310 having a new operation sequence.

According to an embodiment, when performing neural network processing using the block 335 of the layer 310 having the new operation sequence, the NPU 220 may input kernels 315, 319, 312, and 324 to the PEs 411 to 414 of the execution block 410. For example, the NPU 220 may input the kernel 315 to the PE 411 of the execution block 410 by allocating weights of the kernel 315 to each of a plurality of mac units 421 to 429 included in the PE 411 of the execution block 410.

According to an embodiment, when inputting kernels 315, 319, 312, and 324 to the PEs 411 to 414 of the execution block 410, the NPU 220 may not input a first weight (i.e., a weight having a value of "0") among the weights of the kernels 315, 319, 312, and 324 to the mac units of the PEs 411 to 414 of the execution block 410. According to an embodiment, the NPU 220 may omit performing an operation associated with mac units to which weights are not input.

According to an embodiment, the NPU 220 may input corresponding location values of the input data to the respective PEs 411 to 414 of the execution block 410 to which kernels are input.

According to an embodiment, the NPU 220 may perform a multiplying operation and an add operation with respect to corresponding location values of the input data, input to the respective PEs 411 to 414, and the weights of each of the kernels 315, 319, 312, and 324. According to an embodiment, if a weight (e.g., "3") of the kernel 315 and a corresponding location value (e.g., "5") of the input data are input to the mac unit 421 of the PE 411, the NPU 220 may obtain "15" which is the product of 3 and 5 using the mac unit 421. According to an embodiment, the NPU 220 may sum all of operation results respectively from the mac units 421 to 429 using the PE 411. According to an embodiment, the NPU 220 may input a subsequent corresponding location value of the input data to the PE 411 to which the kernel 315 is input, and may perform a multiplying operation and an add operation with respect to the subsequent input data.

According to an embodiment, the NPU 220 may perform neural network processing on output data associated with the input data for the layer 310 using the layer 340 having a turn next to the layer 310. According to an embodiment, until the layer 370 having a last turn, the NPU 220 may perform neural network processing based on output data of a previous layer. According to an embodiment, by determining based on the output data of the layer 370 having a last turn, the NPU 220 may obtain a neural network processing result associated with initial input data (e.g., data input to the layer 310 having a first turn).

As described above, the electronic device 101 may arrange the neural network 301 so as to increase a neural network processing speed. Particularly, the neural network processing speed depends upon a kernel having a largest number of second weights among the kernels included in a block. Accordingly, the neural network processing speed of the electronic device 101 may be increased by minimizing a difference in the number of second weights among the kernels in the block. For example, the largest number of second weights in each of the blocks 331 to 334 of the layer 310 of FIG. 3A is 261, 377, 292, and 258, respectively. The largest number of second weights in each of the blocks 335 to 338 of the layer 310 of FIG. 3B is 377, 247, 227, and 216, respectively. Accordingly, an operation associated with the layer 310 of FIG. 3A may need operation cycles corresponding to 1188 (i.e., the sum of 261, 377, 292, and 258), and an operation associated with the layer 310 of FIG. 3B may need operation cycles corresponding to 1067 (i.e., the sum of 377, 247, 227, and 216). Accordingly, it is identified that a neural network processing speed is increased.

Figure 5:
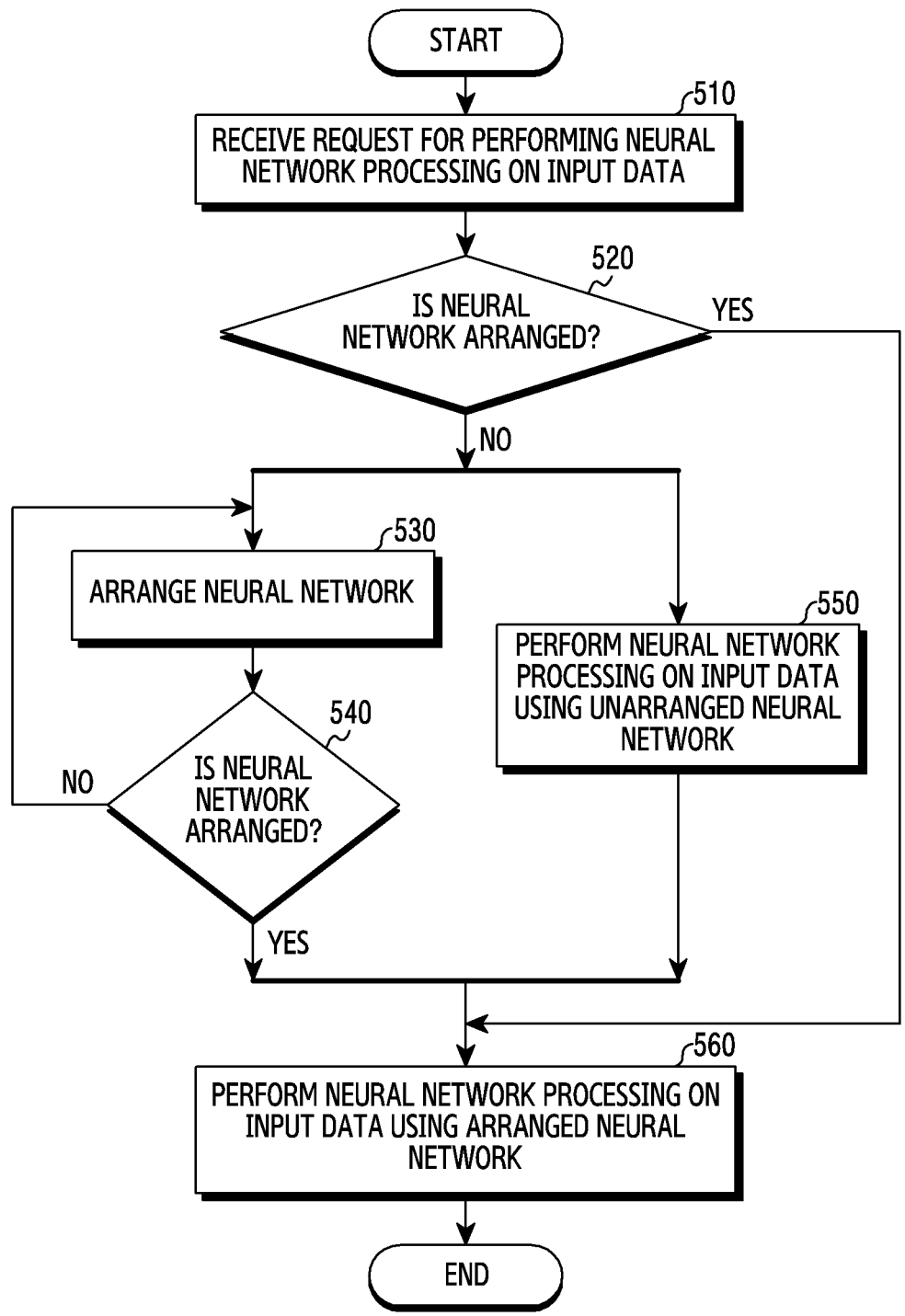
FIG. 5 is a flowchart illustrating an operation of arranging a neural network and performing neural network processing by an electronic device according to an embodiment.

FIG. 5 is a flowchart illustrating an operation of performing neural network processing by arranging a neural network in an electronic device (e.g., the electronic device 101 of FIG. 1) according to an embodiment. The description of FIG. 5 will be provided with reference to FIGS. 1 to 4B.

Referring to FIG. 5, in operation 510, a CPU (e.g., the CPU 210 of FIG. 2A) of the electronic device 101 may receive a request for performing neural network processing on input data. According to an embodiment, the request for performing neural network processing on the input data may be generated by a result of execution of an application (e.g., the application 231 of FIG. 2B). According to an embodiment, the request for performing neural network processing on the input data may be generated in response to a user input (e.g., a touch input, a voice input, a hovering input, or a combination thereof). According to an embodiment, the input data may be data representing an image, a video, a sound, or a combination thereof.

Referring to FIG. 5, in operation 520, the CPU 210 may identify whether a neural network (e.g., the neural network 301 of FIG. 3A) to be used for neural network processing on the input data is arranged. According to an embodiment, the neural network 301 may be a neural network corresponding to the request for performing neural network processing. According to an embodiment, if the request for performing neural network processing is generated by the application 231, the neural network 301 may be a neural network related to the application 231.

According to an embodiment, if changing an operation sequence is completed for the plurality of layers 310, 340, and 370 in the neural network 301, the CPU 210 may identify that the neural network 301 is arranged. According to an embodiment, if changing the operation sequence is not completed for at least one layer of the plurality of layers 310, 340, and 370 in the neural network 301, the CPU 210 may identify that the neural network 301 is not arranged.

Referring to FIG. 5, in operation 520, if the neural network 301 is identified as being unarranged (determined as "No"), the electronic device 101 may perform operations 530 and 550, in parallel. Referring to FIG. 5, in operation 520, if the neural network 301 is identified as being arranged (determined as "Yes"), the electronic device 101 may perform operation 560.

Referring to FIG. 5, in operation 530, the CPU 210 may arrange the neural network 301. According to an embodiment, the CPU 210 may read data representing the neural network 301 in a memory (e.g., the memory 130 of FIG. 1 and FIG. 2A), and may arrange the neural network 301 based on the read data.

According to an embodiment, the CPU 210 may change the operation sequence of the kernels 311 to 326, 341 to 356, and 371 to 386 included in each of the plurality of layers 310, 340, and 370 of the neural network 301, using the zero skipping optimizer (the zero skipping optimizer 234 of FIG. 2B), and may arrange the neural network 301.

According to an embodiment, the CPU 210 may change an operation sequence for a layer having a predetermined number of turns, and may change an operation sequence for a layer having a turn next to the layer having the predetermined numberth turn. According to an embodiment, the CPU 210 may change an operation sequence for a layer having a last turn, and may change operation sequences sequentially from a layer having a first turn to a layer before the layer having the predetermined numberth turn. According to an embodiment, the predetermined numberth turn may be determined to be a first turn. According to an embodiment, the predetermined numberth turn may be determined based on a layer processing speed when neural network processing is performed by the NPU 220. For example, if an operation is capable of being performed for three layers while the NPU 220 performs neural network processing using the neural network 301 during a reference time, the predetermined numberth turn may be a fourth turn. According to an embodiment, the reference time may be a period of time spent in changing an operation sequence for a single layer.

According to an embodiment, the CPU 210 may identify, using the zero skipping optimizer 234, the number of elements having a first weight (a weight having a value of "0") for each of the kernels (e.g., the kernels 311 to 326) included in a layer (e.g., the layer 310) for which an operation sequence is to be changed. According to an embodiment, the CPU 210 may identify, using the zero skipping optimizer 234, the number of elements having a second weight (a weight having a value other than "0") for each of the kernels (e.g., the kernels 311 to 326) included in a layer (e.g., the layer 310) for which an operation sequence is to be changed.

According to an embodiment, the CPU 210 may change a turn that each of the kernels 311 to 326 included in the layer 310 has in an operation sequence, based on the number of second weights. According to an embodiment, the CPU 210 may change a turn that each of the kernels 311 to 326 included in the layer 310 has in the operation sequence so that a kernel having a larger number of second weights has a turn earlier in the operation sequence. According to an embodiment, the CPU 210 may change a turn that each of the kernels 311 to 326 included in the layer 310 has in the operation sequence so that a kernel having a larger number of second weights has a turn later in the operation sequence.

Referring to FIG. 5, in operation 540, the CPU 210 may identify whether the neural network 301 is arranged. According to an embodiment, if the neural network is identified as being arranged, the CPU 210 may report that the neural network 301 is arranged to the NPU 220. According to an embodiment, if the fact that the neural network is arranged is reported, the NPU 220 may suspend operation 550.

According to an embodiment, if the neural network is identified as being arranged (e.g., determined as "Yes"), the electronic device 101 may proceed with operation 560. According to an embodiment, if the neural network is identified as being unarranged (e.g., determined as "No"), the electronic device 101 may continue operation 530.

Referring to FIG. 5, in operation 550, the NPU 220 may perform neural network processing on input data using the unarranged neural network 301. According to an embodiment, the NPU 220 may perform neural network processing on the input data using the unarranged neural network 301 until the neural network is arranged by the CPU 210.

According to an embodiment, the NPU 220 may input, to the PEs 411 to 414 of the execution block 410, the kernels 311 to 314 included in a first block (e.g., the block 331) among the blocks (e.g., blocks 331 to 334) of a layer (e.g., the layer 310) according to an operation sequence. For example, the NPU 220 may input the kernel 315 to the PE 411 of the execution block 410 by allocating the weights of a first kernel (e.g., the kernel 311) of a first block (e.g., the block 331) to each of a plurality of mac units 421 to 429 included in the PE 411 of the execution block 410.

According to an embodiment, the NPU 220 may input corresponding location values of the input data to the respective PEs 411 to 414 of the execution block 410 to which kernels (e.g., the kernels 311 to 314) are input.

According to an embodiment, the NPU 220 may perform a multiplying operation and an add operation with respect to the corresponding location values of the input data, input to the respective PEs 411 to 414, and the weights of each of the kernels (e.g., the kernels 311 to 314). According to an embodiment, if a weight (e.g., "2") of the kernel 311 and a corresponding location value (e.g., "3") of the input data are input to the mac unit 421 of the PE 411, the NPU 220 may obtain "6" which is the product of 2 and 3 using the mac unit 421. According to an embodiment, the NPU 220 may sum all of operation results respectively from the mac unit 421 to 429 using the PE 411. According to an embodiment, the NPU 220 may input subsequent corresponding location values of the input data to the respective PEs 411 to 414 of the execution block 410 to which kernels (e.g., the kernels 311 to 314) are input.

According to an embodiment, if the NPU 220 performs all operations on the input data in association with the PEs 411 to 414 of the execution block 410 to which kernels (e.g., the kernels 311 to 314) are input, the NPU 220 may input, to the PEs 411 to 414 of the execution block 410, kernels 315 to 318 included in a second block (e.g., the block 332) among the blocks (e.g., the blocks 331 to 334) of the layer (e.g., the layer 310) according to the operation sequence. According to an embodiment, the NPU 220 may input corresponding location values of the input data to the respective PEs 411 to 414 of the execution block 410 to which kernels (e.g., the kernels 315 to 318) are input, and may perform a multiplying operation and an add operation with respect to the input data.

According to an embodiment, the NPU 220 may perform the same with respect to the remaining blocks (e.g., the blocks 333 and 334) of the layer (e.g., the layer 310) according to the operation sequence, in the same manner as the first and second blocks, and may perform a multiplying operation and an add operation with respect to the input data.

According to an embodiment, if the NPU 220 performs the same with respect to the all blocks of the layer (e.g., the layer 310) according to the operation sequence, in the same manner as the first and second blocks, the NPU 220 may perform a multiplying operating and an add operation, which use output data of the layer (e.g., the layer 310) as input data, using a layer (e.g., the layer 340) having a turn next to the layer (e.g., the layer 310).

According to an embodiment, if neural network processing is completed before operation 560 is performed, the NPU 220 may perform determination based on output data of the layer 370 having a last turn, and may obtain a neural network processing result associated with initial input data (e.g., data input to the layer 310 having a first turn).

Referring to FIG. 5, in operation 560, the NPU 220 may perform neural network processing on the input data using the arranged neural network 301. According to an embodiment, in operation 560, the NPU 220 may perform neural network processing on the input data using the arranged neural network 301 from a layer having a turn next to a layer that is processed lastly in operation 550.

According to an embodiment, if the layer that is lastly processed in operation 550 is the layer 310, the NPU 220 may perform neural network processing on the input data using the arranged neural network 301 from the layer 340 having a next turn. According to an embodiment, the NPU 220 may perform a multiplying operation and an add operation using the output data of the layer 310 as input data for the layer 340.

According to an embodiment, by performing determination based on the output data of the layer 370 having a last turn, the NPU 220 may obtain a neural network processing result associated with the initial input data (e.g., data input to the layer 310 having a first turn).

Figure 6:
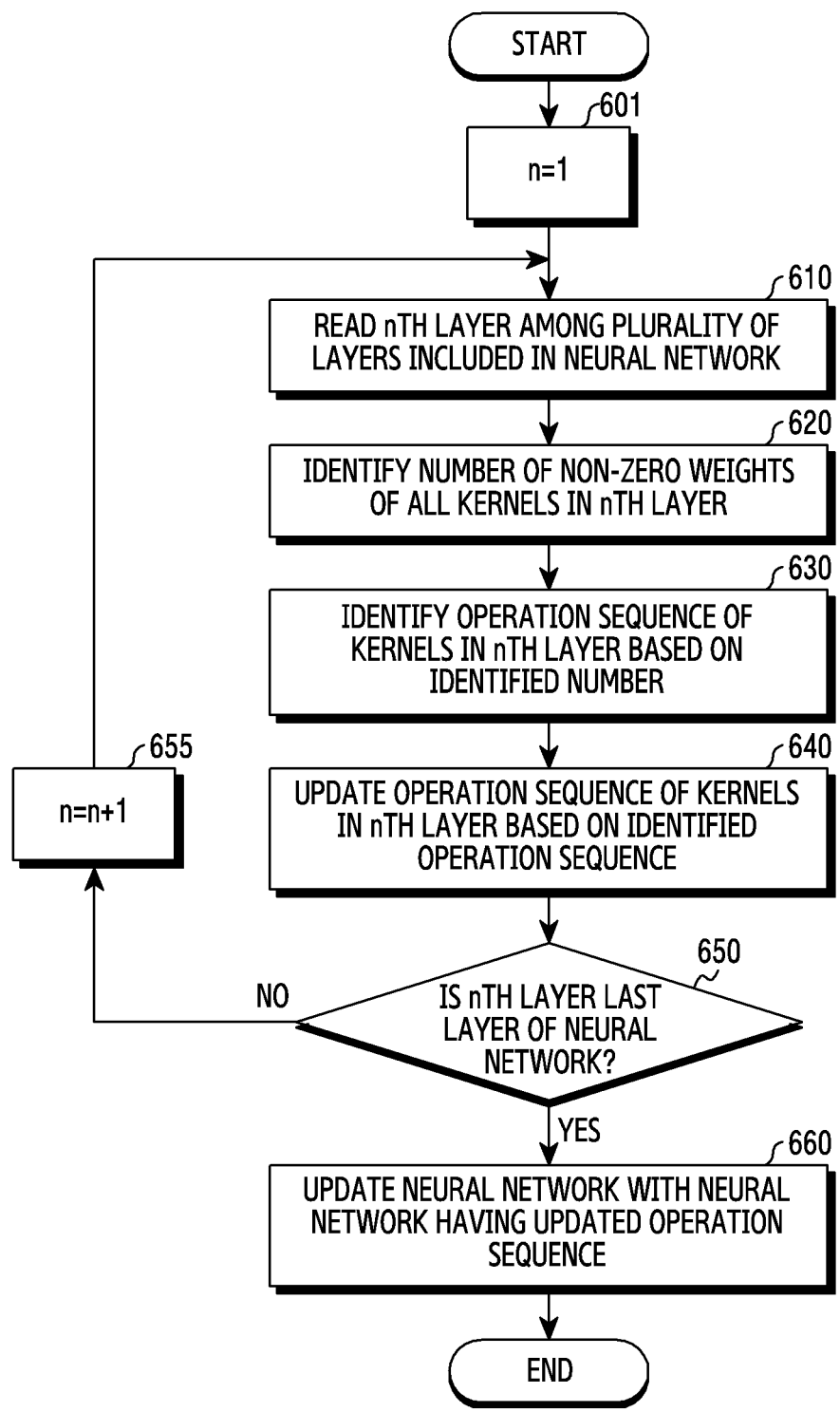
FIG. 6 is a flowchart illustrating an operation of arranging a neural network by an electronic device according to an embodiment.

FIG. 6 is a flowchart illustrating an operation of arranging a neural network in an electronic device (e.g., the electronic device 101 of FIG. 1) according to an embodiment. Operations shown in FIG. 6 may be included in operation 530 of FIG. 5. The description of FIG. 6 will be provided with reference to FIGS. 1 to 4B.

Referring to FIG. 6, in operation 601, a CPU (e.g., the CPU 210 of FIG. 2A) of the electronic device 101 may set n to 1. However, this is merely an example, and n may be set to a natural number. According to an embodiment, n may be determined based on a layer processing speed when neural network processing is performed by the NPU 220. For example, if an operation is capable of being performed for three layers while the NPU 220 performs neural network processing using the neural network 301 during a reference time, n may be determined to be 4. According to an embodiment, the reference time may be a period of time spent in changing an operation sequence for a single layer.

Referring to FIG. 6, in operation 610, a CPU (e.g., the CPU 210 of FIG. 2A) of the electronic device 101 may read, from a memory (e.g., the memory 130 of FIG. 2A), an nth layer among the plurality of layers 310, 340, and 370 included in a neural network (e.g., the neural network 301 of FIG. 3A).

Referring to FIG. 6, in operation 620, the CPU 210 may identify the number of non-zero weights of all kernels in the nth layer. According to an embodiment, a non-zero weight may be a second weight. However, this is merely an example, and the CPU 210 may identify the number of first weights of all kernels in the nth layer.

Referring to FIG. 6, in operation 630, the CPU 210 may identify the operation sequence of the kernels in the nth layer based on the identified number of weights. In an embodiment, the CPU 210 may identify the operation sequence of the kernels in the nth layer in a manner that a kernel has a larger number of second weights has a turn earlier in the operation sequence.

Referring to FIG. 6, in operation 640, the CPU 210 may update the operation sequence of the kernels in the nth layer based on the identified operation sequence.

Referring to FIG. 6, in operation 650, the CPU 210 may identify whether the nth layer is a last layer of the neural network 301.

In operation 650, if the nth layer is the last layer of the neural network 301 (determined as "yes"), the CPU 210 may proceed with operation 660. In operation 650, if the nth layer is not the last layer of the neural network 301 (determined as "No"), the CPU 210 may proceed with operation 655.

Referring to FIG. 6, in operation 655, the CPU 210 may update n with the value of n+1. Referring to FIG. 6, the CPU 210 may update n and may proceed with operation 610 again.

According to an embodiment, in operation 601, if n is determined to be a natural number different from 1, operation 650 may be changed to an operation in which the CPU 210 identifies whether the target layer in operation 640 is an N−1th layer. Here, N may be a number determined in operation 601. According to an embodiment, in operation 601, if n is determined to be a natural number different from 1, operation 655 may be changed to an operation that combines an operation of increasing n by 1 from N to M and an operation of increasing n by 1 from 1 to N−1 when n reaches M. Here, M denotes the number of layers.

Referring again to FIG. 6, in operation 660, the CPU 210 may update a neural network with a neural network in which an operation sequence is updated. According to an embodiment, an operation of updating the neural network may be an operation in which the CPU 210 stores, in the memory 130, a neural network in which the operation sequence is updated.

Figure 7:
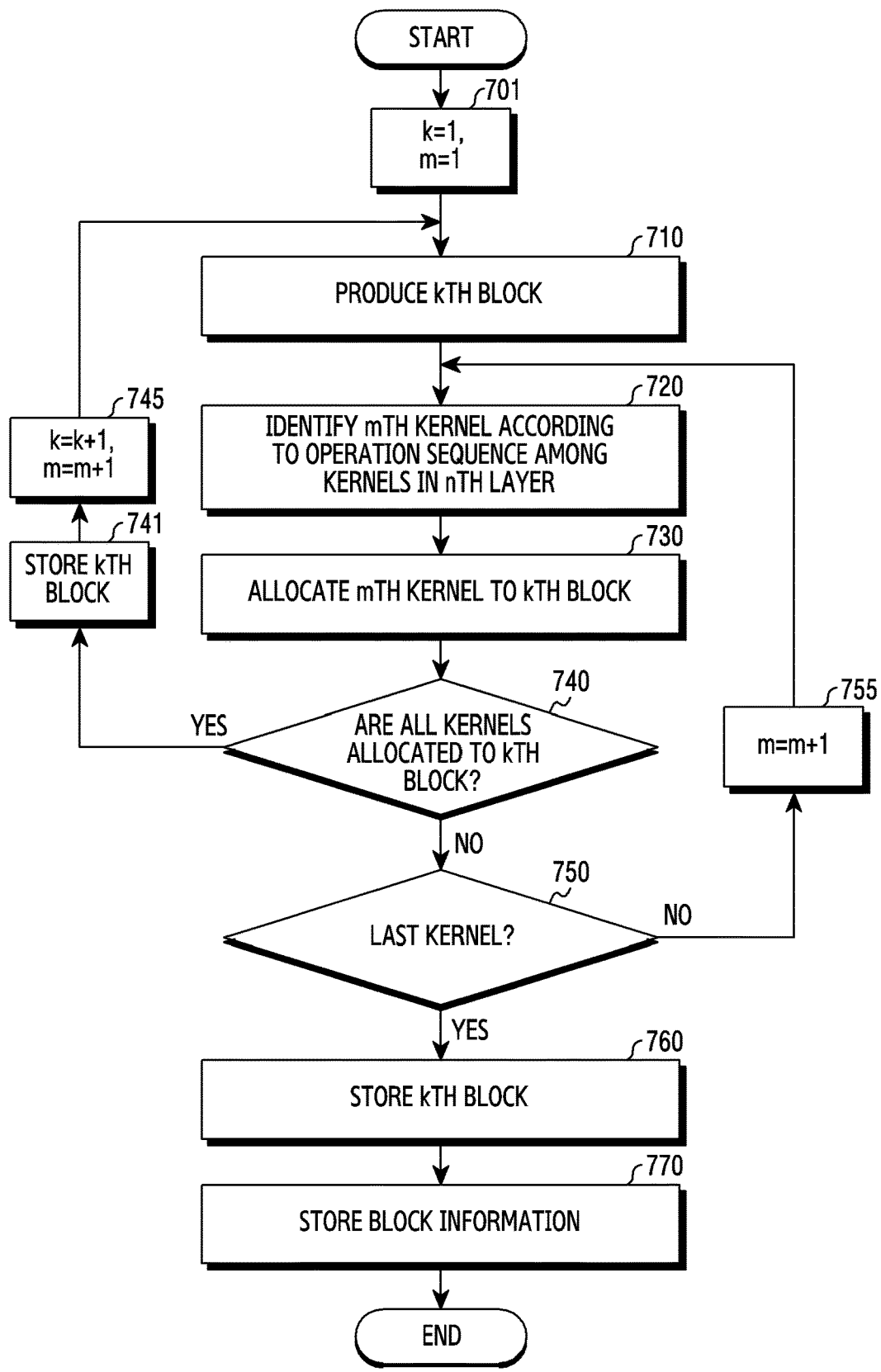
FIG. 7 is a flowchart illustrating an operation of allocating a block to kernels of a neural network by an electronic device according to an embodiment.

FIG. 7 is a flowchart illustrating an operation of allocating a block to kernels of a neural network in an electronic device (e.g., the electronic device 101 of FIG. 1) according to an embodiment. Operations shown in FIG. 7 may be included in operation 640 of FIG. 6. The description of FIG. 7 will be provided with reference to FIGS. 1 to 4B.

Referring to FIG. 7, in operation 710, a CPU (e.g., the CPU 210 of FIG. 2A) of the electronic device 101 may set k and m to 1.

Referring to FIG. 7, in operation 710, the CPU 210 may produce a kth block.

Referring to FIG. 7, in operation 720, the CPU 210 may identify an mth kernel according to an identified operation sequence, from among the kernels in an nth layer.

Referring to FIG. 7, in operation 730, the CPU 210 may allocate the mth kernel to the kth block.

Referring to FIG. 7, in operation 740, the CPU 210 may identify whether all kernels are allocated to the kth block.

In operation 740, if all kernels are allocated to the kth block (determined as "yes"), the CPU 210 may proceed with operation 741. In operation 740, if not all kernels are allocated to the kth block (determined as "No"), the CPU 210 may proceed with operation 750.

Referring to FIG. 7, in operation 741, the CPU 210 may store the kth block in the memory 130.

Referring to FIG. 7, in operation 745, the CPU 210 may increase k and m by 1. Referring to FIG. 7, the CPU 210 may increase k and m by 1, and may proceed with operation 710 again.

Referring to FIG. 7, in operation 750, the CPU 210 may identify whether the mth kernel is a last kernel in the operation sequence.

In operation 740, if the mth kernel is the last kernel in the operation sequence (determined as "yes"), the CPU 210 may proceed with operation 760. In operation 740, if the mth kernel is not the last kernel in the operation sequence (determined as "No"), the CPU 210 may proceed with operation 755.

Referring to FIG. 7, in operation 755, the CPU 210 may increase m by 1. Referring to FIG. 7, the CPU 210 may increase m by 1, and may proceed with operation 710 again.

Referring to FIG. 7, in operation 760, the CPU 210 may store the kth block in the memory 130.

Referring to FIG. 7, in operation 770, the CPU 210 may store block information in the memory 130. According to an embodiment, the block information may include information associated with kernels allocated to blocks, information associated with blocks which were previously allocated to the kernels allocated to the blocks, an output characteristic map, or a combination thereof. According to an embodiment, the output characteristic map may be information associated with a location where an operation result using a kernel needs to be stored.

Figure 8:
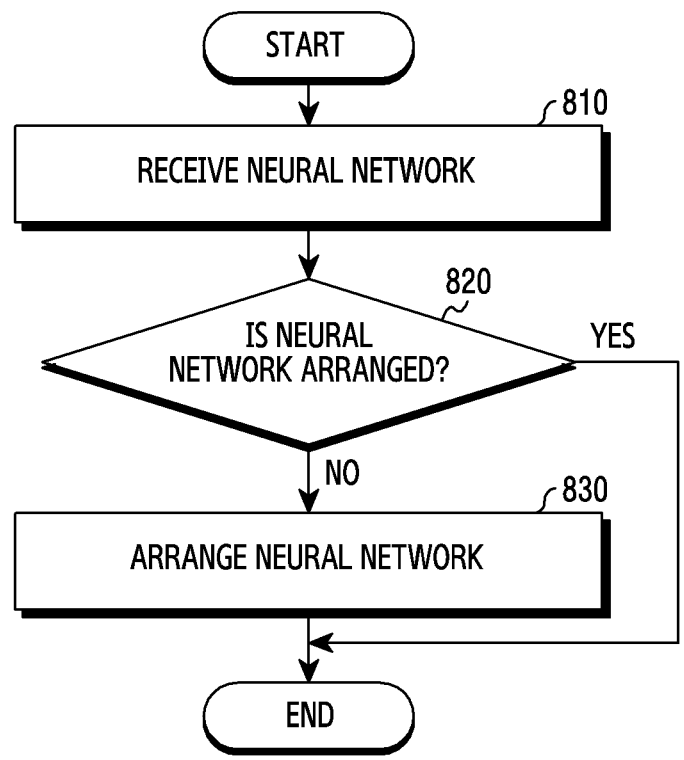
FIG. 8 is a flowchart illustrating an operation of arranging a neural network by an electronic device according to an embodiment.

FIG. 8 is a flowchart illustrating an operation of arranging a neural network in an electronic device (e.g., the electronic device 101 of FIG. 1) according to an embodiment. The description of FIG. 8 will be provided with reference to FIGS. 1 to 4B.

Referring to FIG. 8, in operation 810, a processor (e.g., the processor 120 of FIG. 2A) of the electronic device 101 may receive a neural network (e.g., the neural network 301). According to an embodiment, the processor 120 may receive data including a neural network from a server (e.g., the server 108 of FIG. 1). According to an embodiment, the processor 120 may receive application data including a neural network from the server 108.

Referring to FIG. 8, in operation 820, the processor 120 may identify whether the received neural network 301 is arranged.

According to an embodiment, the processor 120 may identify whether the received neural network 301 is arranged based on metadata associated with the received neural network 301. According to an embodiment, the processor 120 may identify weights of kernels of the received neural network 301, and may identify whether the received neural network 301 is arranged.

In operation 820, if it is identified that the neural network 301 is arranged (determined as "Yes"), the processor 120 may terminate operations in FIG. 8. In operation 820, if it is identified that the neural network 301 is unarranged (determined as "No"), the processor 120 may proceed with operation 830.

According to an embodiment, if the neural network 301 is arranged, the neural network 301 may be arranged by the server 108. In this instance, the server 108 may include a configuration similar to that of the zero skipping optimizer 234 for identifying the weights of kernels, in order to arrange the neural network 301.

Referring to FIG. 8, in operation 830, the processor 120 may arrange the neural network 301. According to an embodiment, operation 830 may correspond to operation 530 of FIG. 5.

According to an embodiment, the processor 120 may arrange the neural network 301, and may store the arranged neural network 301 in the memory 130.

As described above, the electronic device 101 and an operation method thereof may arrange the neural network 301 so as to increase a neural network processing speed.

As described above, according to an embodiment, an electronic device 101 may comprise: a memory storing a neural network including a plurality of layers, each of the plurality of layers comprising a plurality of kernels; and at least one processor. The at least one processor may be configured to: arrange the neural network; and perform neural network processing on input data based on the arranged neural network. The arranging of the neural network may comprise: with respect to each of the plurality of layers of the neural network, identifying a number of first weights of each of a plurality of kernels included in a layer; identifying a turn that each of the plurality of kernels included in the layer has in an operation sequence based on the identified number of first weights; and updating the turn that each of the plurality of kernels has in the operation sequence based on the identified turn for each of the plurality of kernels.

According to an embodiment, the at least one processor may comprise a predetermined number of processing elements, and be configured to: when updating the turn that each of the plurality of kernels has in the operation sequence, separate the plurality of kernels into blocks based on the number of processing elements; and allocate, to each of the processing elements, weights for each of the kernels included in the block, so as to perform neural network processing on the input data.

According to an embodiment, the at least one processor may be configured to: receive a neural network processing request; identify whether a neural network corresponding to the neural network processing request is arranged, and if the neural network is identified as being unarranged, arrange the neural network while performing neural network processing on the input data using the unarranged neural network; identify whether the neural network is at least partially arranged, in response to a fact that the neural network is at least partially arranged, perform neural network processing on the input data using the at least partially arranged neural network.

According to an embodiment, the at least one processor may be configured to: identify whether a turn that each of a plurality of kernels in a layer having a next turn has in an operation sequence is updated, while performing neural network processing on the input data using a layer currently having a turn in the unarranged neural network; and in response to identifying that the turn is updated for each of the plurality of kernels in the layer having the next turn in the at least partially arranged neural network, perform neural network processing on the input data using the layer having the next turn.

According to an embodiment, the at least one processor may be configured to: when arranging the neural network, update a turn that each of a plurality of kernels has in an operation sequence sequentially from a predetermined layer among the plurality of layers of the neural network.

According to an embodiment, the predetermined layer may be a layer having a first turn among the plurality of layers of the neural network.

According to an embodiment, the predetermined layer may be determined based on a layer processing speed.

According to an embodiment, the at least one processor may be configured to: receive, from a server, data of an application including the neural network; identify whether the neural network is arranged in response to reception of the data of the application; and arrange the neural network in response to a fact that the neural network is identified as being unarranged.

According to an embodiment, the at least one processor may be configured to identify whether the neural network is arranged based on a number of first weights of each of the kernels in the neural network, meta information associated with the neural network of the data of the application, or a combination thereof.

According to an embodiment, the at least one processor may include a main processor and a sub-processor, and the main processor may be configured to arrange the neural network, and the sub-processor may be configured to perform neural network processing on input data.

As described above, according to an embodiment, an operation method of an electronic device 101 may comprise: arranging a neural network stored in the electronic device using at least one processor of the electronic device, wherein the neural network may comprise a plurality of layers, each of the plurality of layers comprising a plurality of kernels; and performing, using the at least one processor, neural network processing on input data based on the arranged neural network. The arranging of the neural network may comprise: when arranging the neural network, with respect to each of the plurality of layers of the neural network, identifying a number of first weights of each of a plurality of kernels included in a layer; identifying a turn that each of the plurality of kernels included in the layer has in an operation sequence based on the identified number of first weights; and updating the turn that each of the plurality of kernels has in the operation sequence based on the identified turn for each of the plurality of kernels.

According to an embodiment, the updating of the turn that each of the plurality of kernels has in the operation sequence may comprise: separating the plurality of kernels into blocks based on a number of processing elements included in the at least one processor. The performing of the neural network processing may comprise: allocating weights of each of the kernels included in the block to each of the processing elements.

According to an embodiment, the method may further comprise: receiving the neural network processing request; identifying whether a neural network corresponding to the neural network processing request is arranged; if the neural network is identified as being unarranged, arranging the neural network while performing neural network processing on the input data using the unarranged neural network; identifying whether the neural network is at least partially arranged; and in response to a fact that the neural network is at least partially arranged, performing neural network processing on the input data using the at least partially arranged neural network.

According to an embodiment, the identifying of whether the neural network is at least partially arranged may comprise: identifying whether a turn that each of a plurality of kernels of a layer having a next turn has is updated while performing neural network processing on the input data using a layer currently having a turn in the unarranged neural network. The performing of the neural network processing may further comprise: in response to identifying that the turn is updated for each of the plurality of kernels of the layer having the next turn in the at least partially arranged neural network, performing neural network processing on the input data using the layer having the next turn.

According to an embodiment, the arranging of the neural network may comprise: updating a turn that each of the plurality of kernels has in an operation sequence, sequentially from a predetermined layer.

According to an embodiment, the predetermined layer may be a layer having a first turn among the plurality of layers of the neural network.

According to an embodiment, the predetermined layer may be determined based on a layer processing speed.

According to an embodiment, the method may further comprise: receiving, from a server, data of an application including the neural network; identifying whether the neural network is arranged in response to reception of the data of the application; and arranging the neural network in response to a fact that the neural network is identified as being unarranged.

According to an embodiment, the identifying of whether the neural network is arranged may comprise: identifying whether the neural network is arranged based on a number of first weights of each of the kernels of the neural network, meta information associated with the neural network of the data of the application, or a combination thereof.

As described above, according to an embodiment, a non-transitory computer-readable storage medium may include at least one instructions, which, when executed by at least one processor, cause the at least one processor to: arrange a neural network including a plurality of layers, each of the plurality of layers comprising a plurality of kernels; and based on the arranged neural network, perform neural network processing on input data. The operation of arranging the neural network may include: an operation of identifying the number of first weights of each of a plurality of kernels included in a layer, for each of the plurality of layers of the neural network; an operation of identifying a turn that each of the plurality of kernels included in the layer has in an operation sequence, based on the identified number of first weights; and an operation of updating the turn that each of the kernels has in the operation sequence based on the identified turn for each of the plurality of kernels.

Methods according to embodiments stated in claims or specifications of the disclosure may be implemented by hardware, software, or a combination of hardware and software.

In the case of implementing the methods, a computer-readable storage medium that stores one or more programs (software module) may be provided. One or more programs stored in the computer-readable storage medium may be configured for execution by one or more processors in an electronic device (device). One or more programs may include instructions that enable the electronic device to implement methods according to embodiments described in claims or specifications of the disclosure.

The program (a software module or a software) may be stored in a random access memory, a non-volatile memory including a flash memory, a read only memory (ROM), an electrically erasable programmable read only memory (EEPROM), a magnetic disc storage device, a compact disc-ROM (CD-ROM), a digital versatile discs (DVDs), or an optical storage device in another form, or a magnetic cassette. Alternatively, the program may be stored in a memory configured as a combination of some or all of them. In addition, multiple component memories may be configured in the memory.

In addition, the program may be stored in an attachable storage device that may be accessed via a communication network such as the Internet, an intranet, a local area network (LAN), a wide LAN (WLAN), or a storage area network (SAN), or a communication network configured as a combination thereof. The storage device may access a device, which implements embodiments of the disclosure, via an external port. In addition, a separate storage device in a communication network may access a device which implements embodiments of the disclosure.

In detailed embodiments of the disclosure, component elements included in the disclosure may be expressed as a single entity or multiple entities, depending on a detailed embodiment. However, the expression of a single entity or multiple entities is selected to be appropriate for the given situation for ease of description. The disclosure may not be limited to a single component or multiple component elements, and a component element expressed as multiple entities may be configured as a single entity and a component element expressed as a single entity may be configured as multiple entities.

Although the detailed descriptions of the disclosure describe detailed embodiments, various modifications are allowed within the scope of the disclosure. Therefore, the scope of the disclosure should not be limited to the above-described embodiments, and should be defined by the scope of claims set forth below and the equivalents thereto.

The invention claimed is:

1. An electronic device comprising:
a memory storing a neural network including a plurality of layers, each of the plurality of layers comprising a plurality of kernels; and
at least one processor including a CPU (central processing unit) and an NPU (neural processing unit),
wherein instructions stored in the memory, when executed by the at least one processor, cause the electronic device to:
receive, by the CPU, a request for performing neural network processing on input data;
in response to receiving the request:
identify, by the CPU, whether changing of an operation sequence of the plurality of kernels based on a number of non-zero weights is completed;
in response to identifying the changing of the operation sequence of the plurality of kernels based on the number of non-zero weights is uncompleted:
perform, by the NPU, the neural network processing with respect to a first layer of the neural network using the input data, wherein the plurality of kernels in the first layer is unarranged;
while performing the neural network processing with respect to the first layer by the NPU, arrange kernels of a second layer in the neural network by the CPU, wherein the second layer is one of next layers of the first layer;
while performing the neural network processing with respect to the first layer by the NPU, receive, by the NPU, from the CPU, a notification indicating that arranging of the plurality of kernels is terminated;
stop performing the neural network processing with respect to unarranged layers, in response to the notification; and
perform, by the NPU, the neural network processing with respect to the second layer including the arranged kernels, after performing the neural network processing with respect to the first layer including the plurality of unarranged kernels,
wherein the arranging of the plurality of kernels of the neural network comprises:
with respect to each of the plurality of layers of the neural network,
identifying, by the CPU, the number of non-zero weights of each of the plurality of kernels included in a layer;
identifying, by the CPU, a turn that each of the plurality of kernels included in the layer has in the operation sequence based on the identified number of the non-zero weights;
generating, by the CPU, a plurality of execution blocks of the NPU, wherein each block corresponds to at least one processing element of the NPU,
allocating, by the CPU, the plurality of kernels into the plurality of blocks based on the identified turn for each of the plurality of kernels, wherein a pre-determined number of kernels are separately allocated into each block of the plurality of blocks according to the turns in the operation sequence,
storing, by the CPU, the plurality of blocks in the memory, and
transmitting, by the CPU, to the NPU, the notification indicating that arranging of the plurality of kernels is terminated.

2. The electronic device as claimed in claim 1,
wherein the instructions stored in the memory, when executed by the at least one processor, cause the electronic device to:
identify whether the turn that each of the kernels in the second layer has in the operation sequence is updated according to the kernels of the second layer being arranged, while performing the neural network processing with respect to the first layer;

in response to identifying that the turn is updated, perform the neural network processing with respect to the second layer.

3. The electronic device as claimed in claim 1, wherein the second layer is predetermined layer among the plurality of layers of the neural network.

4. The electronic device as claimed in claim 3, wherein the predetermined layer is determined as a layer having a first turn among the next layers of the first layer.

5. The electronic device as claimed in claim 3, wherein the predetermined layer is determined based on a layer processing speed.

6. The electronic device as claimed in claim 1, wherein the instructions stored in the memory, when executed by the at least one processor, cause the electronic device to:
receive, from a server, data of an application including the neural network;
identify whether the plurality of kernels in the neural network is arranged in response to reception of the data of the application; and
arrange the plurality of kernels in the neural network in response to identifying that the plurality of kernels in the neural network is identified as being unarranged.

7. The electronic device as claimed in claim 1, wherein the CPU is configured to cause the electronic device to arrange the plurality of kernels in the neural network, and the NPU is configured to cause the electronic device to perform the neural network processing on input data.

8. An operation method of an electronic device comprising a memory storing a neural network including a plurality of layers comprising a plurality of kernels, and at least one processor including a CPU (central processing unit) and an NPU (neural processing unit), the method comprising:
receiving, by the CPU, a request for performing neural network processing on input data;
in response to receiving the request:
identifying, by the CPU, whether changing of an operation sequence of the plurality of kernels based on a number of non-zero weights is completed;
in response to identifying the changing of the operation sequence of the plurality of kernels based on the number of non-zero weights is uncompleted:
performing, by the NPU, the neural network processing with respect to a first layer of the neural network using the input data, wherein the plurality of kernels in the first layer is unarranged;
while performing the neural network processing with respect to the first layer, by the NPU, arranging kernels of a second layer in the neural network by the CPU, wherein the second layer is one of next layers of the first layer;
while performing the neural network processing with respect to the first layer by the NPU, receiving, by the NPU, from the CPU, a notification indicating that arranging of the plurality of kernels is terminated;
stopping performing the neural network processing with respect to unarranged layers, in response to the notification; and
performing, by the NPU, the neural network processing with respect to the second layer including the arranged kernels, after performing the neural network processing with respect to the first layer including the plurality of unarranged kernels,
wherein the arranging of the plurality of kernels of the neural network comprises:

when arranging the neural network, with respect to each of the plurality of layers of the neural network,
identifying, by the CPU, the number of non-zero weights of each of the plurality of kernels included in a layer;
identifying, by the CPU, a turn that each of the plurality of kernels included in the layer has in the operation sequence based on the identified number of the non-zero weights;
generating, by the CPU, a plurality of execution blocks of the NPU, wherein each block corresponds to at least one processing element of the NPU,
allocating, by the CPU, the plurality of kernels into the plurality of blocks based on the identified turn for each of the plurality of kernels, wherein a pre-determined number of kernels are separately allocated into each block of the plurality of blocks according to the turns in the operation sequence,
storing, by the CPU, the plurality of blocks in the memory, and
transmitting, by the CPU, to the NPU, the notification indicating that arranging of the plurality of kernels is terminated.

9. The method as claimed in claim 8, further comprising:
identifying whether the turn that each of the kernels in the second layer has in the operation sequence is updated according to the kernels of the second layer being arranged, while performing the neural network processing with respect to the first layer.

10. The method as claimed in claim 8, wherein the second layer is a predetermined layer having a first turn among the next layers of the first layer.

11. The method as claimed in claim 10, wherein the predetermined layer is determined as a layer having a first turn among the next layers of the first layer.

12. The method as claimed in claim 10, wherein the predetermined layer is determined based on a layer processing speed.

13. The method as claimed in claim 8, further comprising:
receiving, from a server, data of an application including the neural network;
identifying whether the plurality of kernels in the neural network is arranged in response to reception of the data of the application; and
arranging the plurality of kernels in the neural network in response to identifying that the plurality of kernels in the neural network is identified as being unarranged.

14. The method as claimed in claim 8, wherein the identifying whether the plurality of kernels in the neural network is arranged comprises:
identifying whether the plurality of kernels in the neural network is arranged based on the number of the non-zero weights of each of the kernels in the neural network, meta information associated with the neural network of the data of an application, or a combination thereof.

15. A non-transitory computer-readable storage medium comprising at least one instruction; and
a neural network including a plurality of layers, each of the plurality of layers comprising a plurality of kernels, and
wherein the instructions, when executed by at least one processor including a CPU (central processing unit) and an NPU (neural processing unit), cause an electronic device to:
receive, by the CPU, a request for performing neural network processing on input data;

in response to receiving the request:
  identifying, by the CPU, whether changing of an operation sequence of the plurality of kernels based on a number of non-zero weights is completed;
  in response to identifying the changing of the operation sequence of the plurality of kernels based on the number of non-zero weights is uncompleted:
    perform, by the NPU, the neural network processing with respect to a first layer of the neural network using the input data, wherein the plurality of kernels in the first layer is unarranged;
    while performing the neural network processing with respect to the first layer by the NPU, arrange kernels of a second layer in the neural network by the CPU, wherein the second layer is one of next layers of the first layer;
    while performing the neural network processing with respect to the first layer by the NPU, receive, by the NPU, from the CPU, a notification indicating that arranging of the plurality of kernels is terminated;
    stop performing the neural network processing with respect to unarranged layers, in response to the notification; and
    perform, by the NPU, the neural network processing with respect to the second layer including the arranged kernels, after performing the neural network processing with respect to the first layer including the plurality of unarranged kernels,
wherein the arranging of the plurality of kernels of the neural network comprises:
  with respect to each of the plurality of layers of the neural network,
    identifying, by the CPU, the number of non-zero weights of each of the plurality of kernels included in a layer;
    identifying, by the CPU, a turn that each of the plurality of kernels included in the layer has in the operation sequence based on the identified number of the non-zero weights;
  generating, by the CPU, a plurality of execution blocks of the NPU, wherein each block corresponds to at least one processing element of the NPU,
    allocating, by the CPU, the plurality of kernels into the plurality of blocks based on the identified turn for each of the plurality of kernels, wherein a pre-determined number of kernels are separately allocated into each block of the plurality of blocks according to the turns in the operation sequence,
  storing, by the CPU, the plurality of blocks in a memory, and
  transmitting, by the CPU, to the NPU, the notification indicating that arranging of the plurality of kernels is terminated.

* * * * *